(12) United States Patent
Abiko et al.

(10) Patent No.: US 6,516,408 B1
(45) Date of Patent: Feb. 4, 2003

(54) VARIOUS LENGTH SOFTWARE BREAKPOINT IN A DELAY SLOT

(75) Inventors: Shigeshi Abiko, Tokyo To Kita Ku (JP); Gilbert Laurenti, Saint Paul de Vence (FR); Mark Buser, Pittsburgh, PA (US); Eric Ponsot, Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,862

(22) Filed: Oct. 1, 1999

(30) Foreign Application Priority Data

Oct. 6, 1998 (EP) .............................................. 98402455
Mar. 8, 1999 (EP) .............................................. 99400558

(51) Int. Cl.[7] .............................................. G06F 9/44
(52) U.S. Cl. ....................................... 712/227; 717/129
(58) Field of Search .............................. 712/227; 717/4, 717/129

(56) References Cited

U.S. PATENT DOCUMENTS

| | | | | | |
|---|---|---|---|---|---|
| 4,866,665 | A | * | 9/1989 | Haswell-Smith | 714/35 |
| 5,163,139 | A | * | 11/1992 | Haigh et al. | 712/206 |
| 5,564,028 | A | * | 10/1996 | Swoboda et al. | 712/227 |
| 5,923,705 | A | * | 7/1999 | Willkie et al. | 375/219 |

OTHER PUBLICATIONS

Motorola, MC68030 Enhanced 32–Bit Microprocessor User's Manual, 1989, Prentice–Hall, 2nd Ed., pp. 3–56, 3–57, and 3–75.*
TI–27677, *A Bit Field Processor*, co–filed as a regular application Oct. 1, 1999.
TI–27678, *Rounding Mechanisms in Processors*, co–filed as a regular application Oct. 1, 1999.
TI–27679, *Linear Vector Computation*, co–filed as a regular application Oct. 1, 1999.
TI–27680, *Hardware Accelerator / Acceleration for Processing Systems*, co–filed as a regular application Oct. 1, 1999.
TI–27681, *Pipeline Protection*, co–filed as a regular application Oct. 1, 1999.
TI–27682, *Pipelined Hardware Stack*, co–filed as a regular application Oct. 1, 1999.
TI–27683, *A Processor With Conditional Execution of an Instruction Pair*, co–filed as a regular application Oct. 1, 1999.
TI–27684, *A Processor With Local Instruction Looping*, co–filed as a regular application Oct. 1, 1999.
TI–27685, *Compound Memory Access Instructions*, co–filed as a regular application Oct. 1, 1999.
TI–27686, *A Processor With a Computed Repeat Instruction*, co–filed as a regular application Oct. 1, 1999.

(List continued on next page.)

*Primary Examiner*—Eddie Chan
*Assistant Examiner*—Stephanie Deckter
(74) *Attorney, Agent, or Firm*—Gerald E. Laws; W. James Brady, III; Frederick J. Telecky, Jr.

(57) ABSTRACT

A processor (100) is provided that is a programmable digital signal processor (DSP) with variable instruction length, offering both high code density and easy programming. Instructions may be executed during delay slots after program branching while an execution pipeline is being restarted. Architecture and instruction set are optimized for low power consumption and high efficiency execution of DSP algorithms, such as for wireless telephones, as well as pure control tasks. A software breakpoint instruction is provided for debugging purposes. In order to correctly emulate the operation of the instruction pipeline when a software breakpoint instruction is executed during a delay slot, the width (1110–1115) of the software breakpoint is the same as the replaced instruction. A limited number of breakpoint instruction length formats (1100, 1102) are combined with non-operational instructions (NOP, NOP_16) to form a large number of combination instructions that match any instruction length format.

15 Claims, 10 Drawing Sheets

OTHER PUBLICATIONS

TI–27688, *A Processor With Apparatus for Verifying Instruction Parallelism*, co–filed as a regular application Oct. 1, 1999.
TI–27689, *Cache Miss Benchmarking*, co–filed as a regular application Oct. 1, 1999.
TI–27690, *A Processor With Apparatus for Indexed Branch During Instruction Iteration*, co–filed as a regular application Oct. 1, 1999.
TI–27691, *Circular Buffer Management*, co–filed as a regular application Oct. 1, 1999.
TI–27700, *Method and Apparatus for Accessing a Memory Core Multiple Times in a Single Clock Cycle*, co–filed as a regular application Oct. 1, 1999.
TI–27757, *Improved Multiplier Accumulator Circuits*, co–filed as a regular application Oct. 1, 1999.
TI–27758, *Zero Anticipation Method and Apparatus*, co–filed as a regular application Oct. 1, 1999.
TI–27759, *Trace FIFO Management*, co–filed as a regular application Oct. 1, 1999.
TI–27760, *Stack Pointer Management*, co–filed as a regular application Oct. 1, 1999.
TI–27761, *Software Breakpoint in a Delay Slot*, co–filed as a regular application Oct. 1, 1999.
TI–27762, *Cache Coherence During Emulation*, co–filed as a regular application Oct. 1, 1999.
TI–27763, *Memory Access Using Byte Qualifiers*, co–filed as a regular application Oct. 1, 1999.
TI–27764, *Dual Interrupt Vector Mapping*, co–filed as a regular application Oct. 1, 1999.
TI–28234, *Pipeline Protection*, co–filed as a regular application Oct. 1, 1999.
TI–28433, *Improvement in or Relating to Microprocessors*, co–filed as a regular application Oct. 1, 1999.

* cited by examiner

VARIOUS LENGTH SOFTWARE BREAKPOINT IN A DELAY SLOT

This application claims priority to Ser. No. 99400558.5, filed in Europe on Mar. 8, 1999 and Ser. No. 98402455.4, filed in Europe on Oct. 6, 1998.

FIELD OF THE INVENTION

The present invention relates to processors, and to emulation of a processor for debugging hardware or software.

BACKGROUND OF THE INVENTION

Microprocessors are general purpose processors which require high instruction throughputs in order to execute software running thereon, and can have a wide range of processing requirements depending on the particular software applications involved. It is known to provide a stack that can be used to pass variables from one software routine to another. Stacks are also used to maintain the contents of the program counter when a first software routine calls a second software routine, so that program flow can return to the first software routine upon completion of the called second routine. A call within the second software routine can call a third routine, etc. Furthermore, it is known to provide a software breakpoint instruction to be used during software debugging.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit operable to decode an instruction fetched from an instruction memory. The instruction may have a number of instruction format lengths. The processor also has a data computation unit for executing the instructions decoded by the instruction buffer unit and a program counter operable to provide an instruction address that is provided to the instruction memory. The instruction buffer unit is operable to decode a software breakpoint instruction (SWBP) having a length equal to any of the instruction length formats of the instruction set.

In accordance with another aspect of the present invention, the instruction buffer is operable to decode a software breakpoint instruction combined with a non-operational instruction in a single cycle such that the combined software breakpoint instruction and the non-operational instruction (NOP) are treated as a single instruction by the data computation unit.

In accordance with another aspect of the present invention, the software breakpoint instruction has a small number of instruction length formats which is less than the number of instruction length formats in the complete instruction set. However, for the combination of SWBP and NOP instruction, there is a combined instruction length format to match each instruction length format of the instruction set.

In accordance with another aspect of the present invention, a method of operating a digital system is provided. A plurality of instructions are executed in an instruction pipeline of the processor core, wherein the instructions are fetched in response to a program counter from an instruction memory associated with the processor core, wherein the sequence of instructions are selected from an instruction set having a number of instruction length formats. During emulation, an instruction in the sequence of instructions is replaced with a software breakpoint instruction having the same instruction length format as the instruction it replaces, regardless of length. The execution sequence is broken by executing the software breakpoint instruction after executing a portion of the sequence of instructions. Then, execution of the sequence of instructions is resumed by replacing the software breakpoint instruction with the previously replaced instruction in the sequence of instructions.

Another aspect of the present invention is that the first software breakpoint instruction is formed by selecting a one of a few software breakpoint instruction and combining the software breakpoint instruction with non-operational instruction such that the combined length of the software breakpoint instruction and the non-operational instruction is equal to the instruction length of the replaced instruction.

Another aspect of the present invention is that when a software breakpoint instruction is executed in a delay slot resulting from executing a discontinuity type instruction, a return address is stored with the same value as if the replaced instruction where present in the sequence of instructions.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
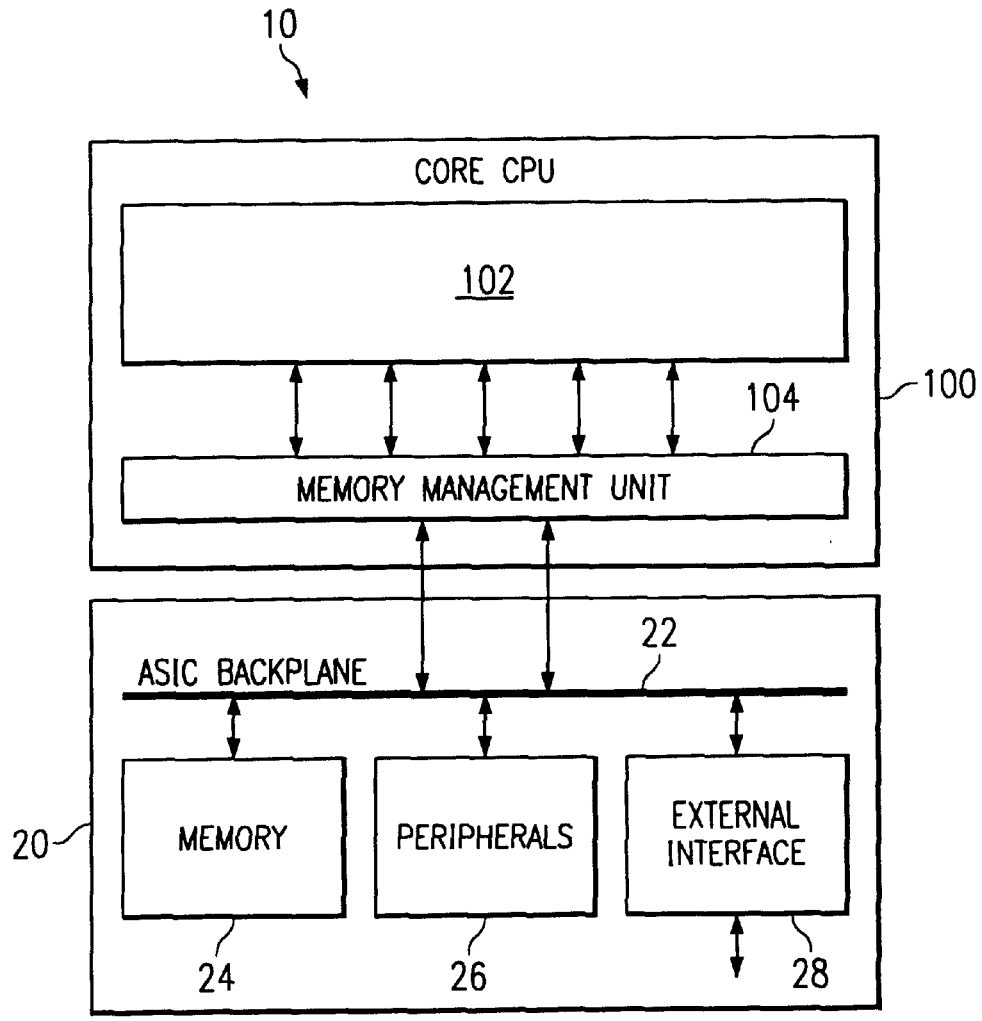
FIG. 1 is a schematic block diagram of a processor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977, which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction cache memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
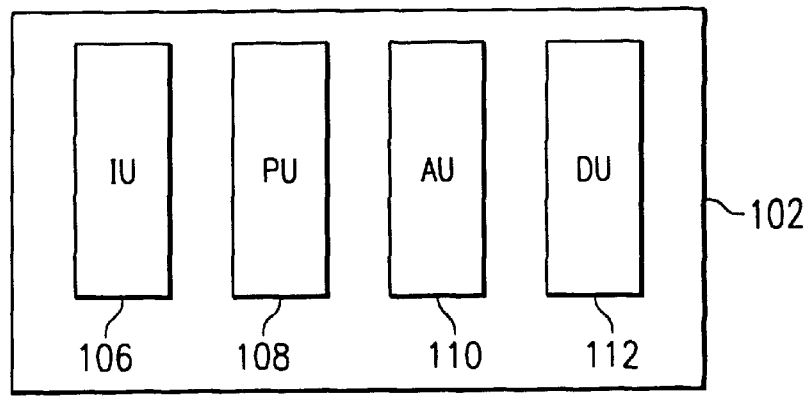
FIG. 2 is a schematic diagram of a core of the processor of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
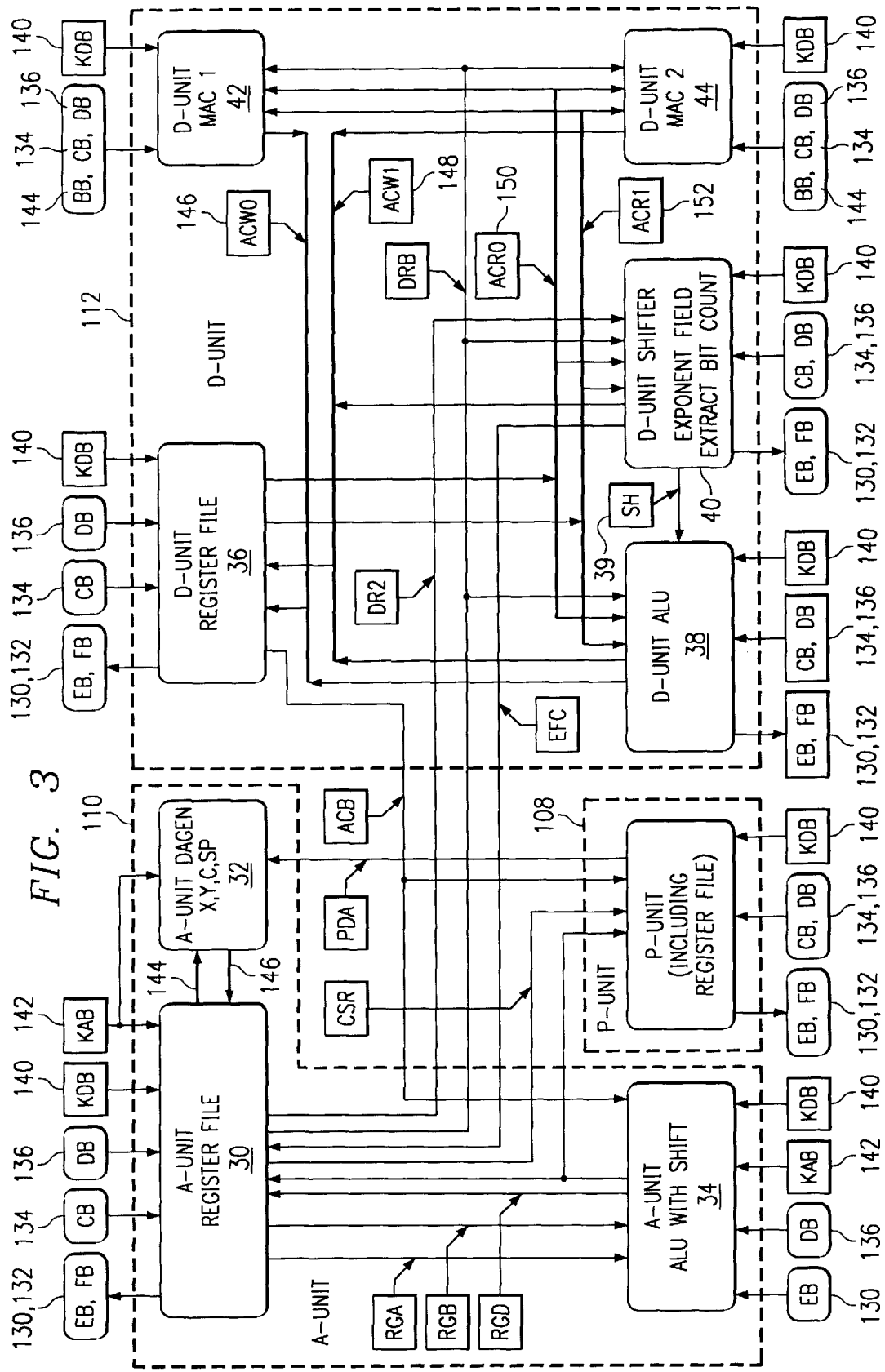
FIG. 3 is a more detailed schematic block diagram of various execution units of the core of the processor.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB, DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB,FB,CB,DB and KDB) 130, 132, 134, 136 and 140, and the MAC units 42 and 44 are coupled to the buses (CB, DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
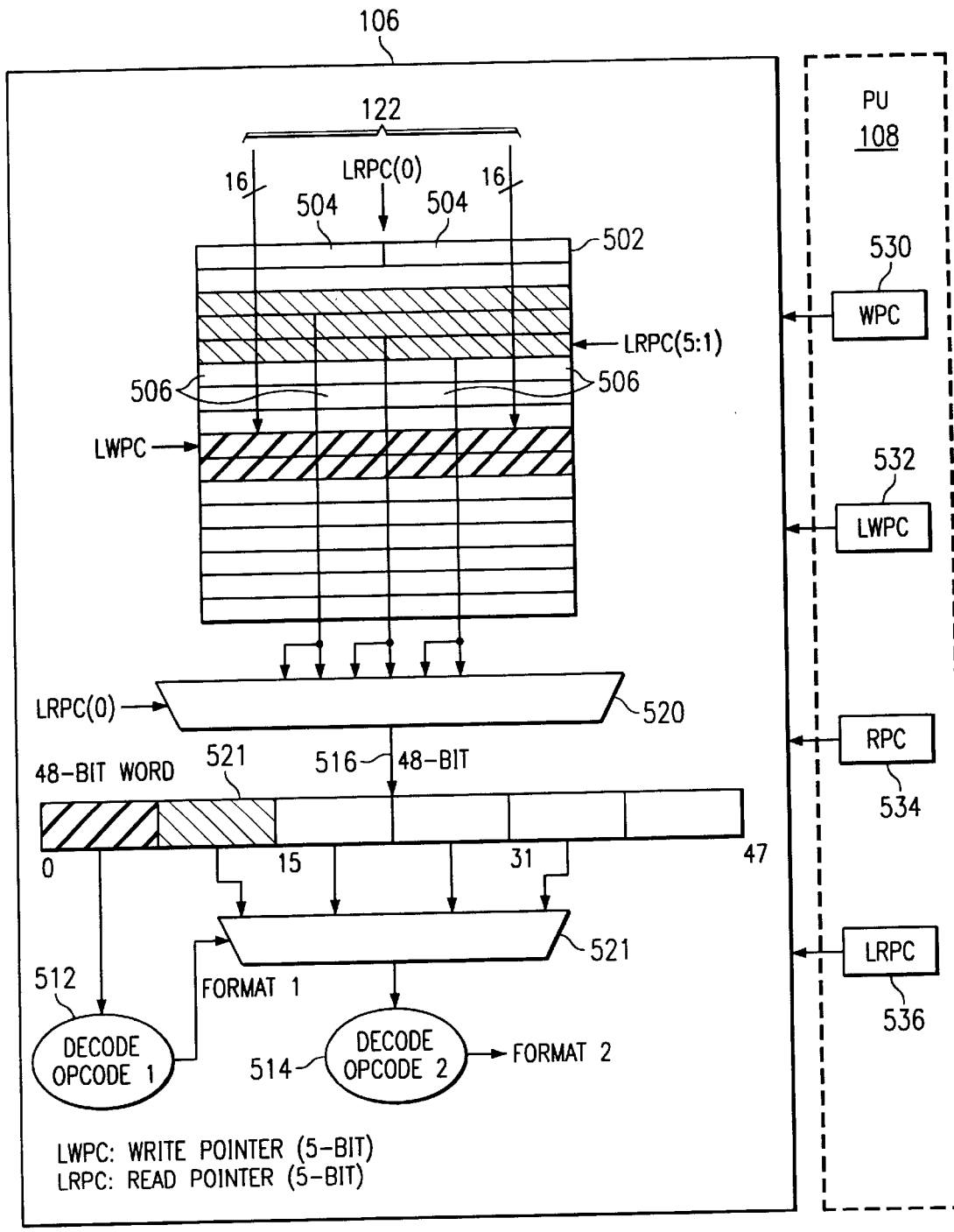
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexors 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Figure 5:
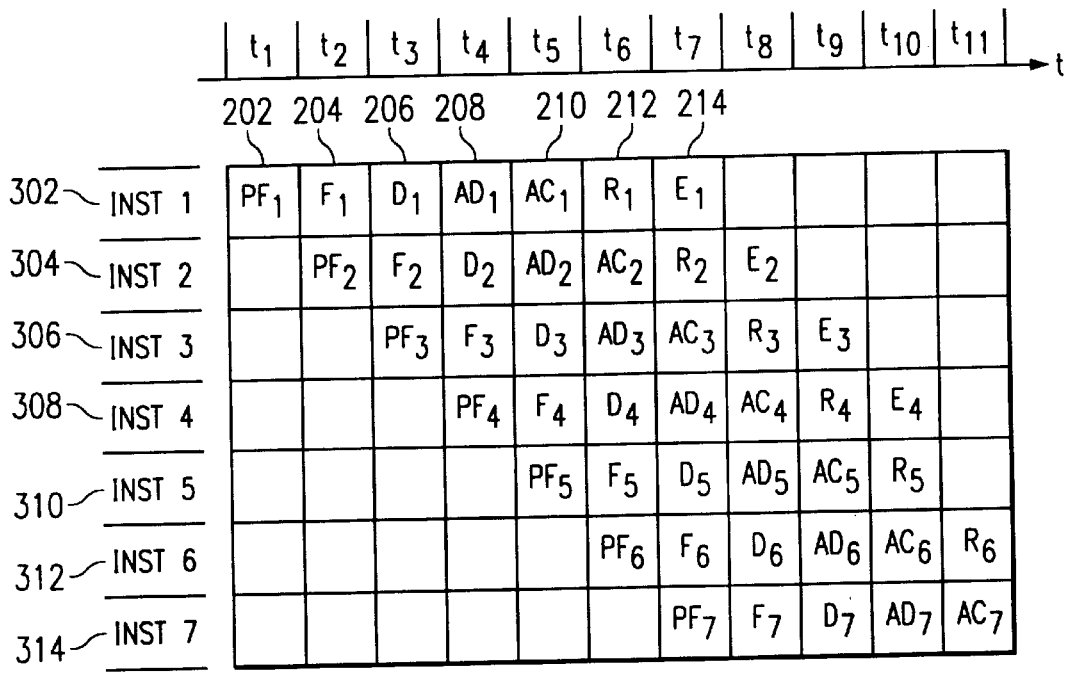
FIG. 5 is a schematic representation of the core of the processor for explaining the operation of the pipeline of the processor.

Processor core 102 executes instructions through a 7 stage pipeline, the respective stages of which will now be described with reference to Table 1 and to FIG. 5. The processor instructions are executed through a 7 stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1 the Processor Pipeline Description for a
Single Cycle Instruction With No Memory Wait States

| Pipeline stage | Description. |
| --- | --- |
| P0 Pre-Fetch | Address program memory via the program address bus PAB. |
| P1 Fetch | Read program memory through the program bus PB. Fill instruction buffer queue with the 4 bytes fetched in program memory. |
| P2 Decode | Read instruction buffer queue (6 bytes) Decode instruction pair or single instruction. Dispatch instructions on Program Flow Unit (PU), Address Data Flow Unit (AU), and Data Computation Unit (DU). |
| P3 Address | Data address computation performed in the 3 address generators located in AU: Pre-computation of address to be generated in: direct SP/DP relative addressing mode. indirect addressing mode via pointer registers. Post-computation on pointer registers in: |

TABLE 1-continued the Processor Pipeline Description for a
Single Cycle Instruction With No Memory Wait States

| Pipeline stage | Description. |
|---|---|
| | indirect addressing mode via pointer registers. Program address computation for PC relative branching instructions: goto, call, switch. |
| P4 Access | Read memory operand address generation on BAB, CAB, DAB buses. Read memory operand on CB bus (Ymem operand). |
| P5 Read | Read memory operand on DB (Smem, Xmem operand), on CB and DB buses (Lmem operand), on BB (coeff operand) Write memory operand address generation on EAB and FAB buses. |
| P6 Execute | Execute phase of data processing instructions executed in A unit and D unit. Write on FB bus (Ymem operand). Write Memory operand on EB (Smem, Xmem operand ), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: If a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302, 304, 306, 308, 310, 312, 314, FIG. 5 shows them all under process in time period $T_7$. Such a structure adds a form of parallelism to the processing of instructions.

Figure 6:
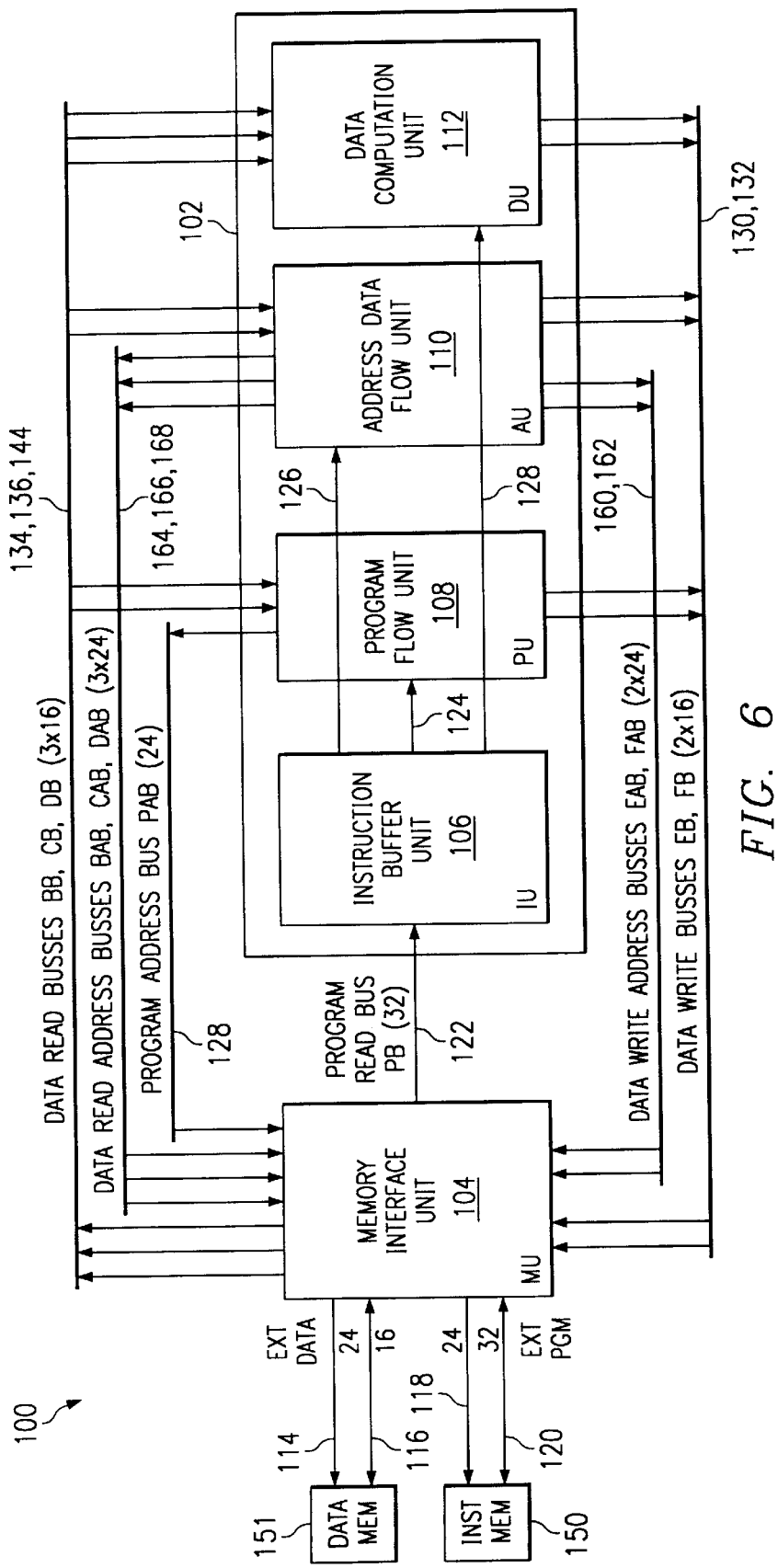
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figure 7:
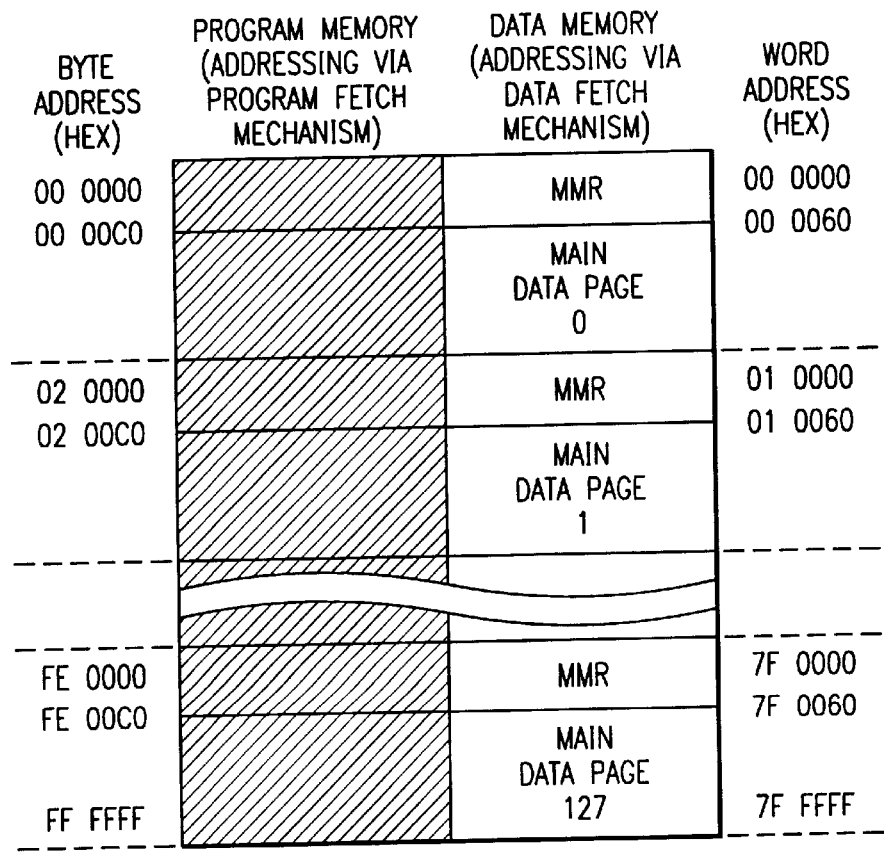
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

TABLE 2

Summary of Improved Processor 100

Very Low Power programmable processor
Parallel execution of instructions, 8 bit to 48 bit instruction format
Seven stage pipeline (including pre-fetch)

| | |
|---|---|
| Instruction buffer unit highlight | 32 × 16 buffer size |
| | Parallel Instruction dispatching |
| | Local Loop |
| Data computation unit highlight | Four 40 bit generic (accumulator) registers |
| | Single cycle 17 × 17 Multiplication-Accumulation (MAC) |
| | 40 bit ALU, "32 + 8" or "(2 × 16) + 8" |
| | Special processing hardware for Viterbi functions |
| | Barrel shifter |
| Program flow unit highlight | 32 bits/cycle program fetch bandwidth |
| | 24 bit program address |
| | Hardware loop controllers (zero overhead loops) |
| | Interruptible repeat loop function |
| | Bit field test for conditional jump |
| | Reduced overhead for program flow control |
| Data flow unit highlight | Three address generators, with new addressing modes |
| | Three 7 bit main data page registers |
| | Two Index registers |
| | Eight 16 bit pointers |
| | Dedicated 16 bit coefficients pointer |
| | Four 16 bit generic registers |
| | Three independent circular buffers |
| | Pointers & registers swap |
| | 16 bits ALU with shift |
| Memory Interface highlight | Three 16 bit operands per cycle |
| | 32 bit program fetch per cycle |
| | Easy interface with cache memories |

C compiler
Algebraic assembler

In order to perform software or hardware debugging, it is known to connect an emulation host processor to a microprocessor being tested so that the host processor can display the contents of various internal registers in response to various software or hardware events, as described in previously referenced U.S. Pat. No. 5,329,471 issued to Gary Swoboda. Software events can be generated by replacing in instruction in a program with a software breakpoint instruction. The host processor is invoked when the software breakpoint instruction is executed by the microprocessor being tested. Similarly, debug software on the microprocessor being tested can be invoked by executing the software breakpoint instruction.

A software breakpoint is implemented by replacing the originally loaded instruction with one that will cause the processor to halt execution. Emulation software uses the following steps when setting a software breakpoint:

1. The debugger specifies a byte address of an instruction to be replaced with a software breakpoint.
2. Emulation software reads a portion, typically 64 bits, of the program starting at that byte address.
3. Emulation software determines the size of the original instruction, taking into consideration parallelism, soft dualism, etc.
4. Emulation software selects a software breakpoint instruction of the same size as the original instruction and writes it to program memory.
5. Emulation software then verifies that the software breakpoint is present in memory by reading it and comparing the result to what was written. In case the specified address was read only memory (ROM), then use of a software breakpoint is not feasible and a hardware breakpoint is used instead.

Several instructions are provided in the instruction set of processor 100 for use by emulation. ESTOP 0 is used for a software breakpoint. When an emulator is connected, the ESTOP 0 instruction stops processor execution with the PC pointing to the ESTOP 0 instruction. This instruction is used to implement a debugger software breakpoint. If an emulator is not connected (run state machine (RSM) is in the EXE_CONT state), this instruction is effectively a NOP, with the PC incrementing past the ESTOP 0 instruction. This instruction is effective at the DECODE pipe stage. There are two formats for the ESTOP 0 instruction, a 32 bit and 8 bit format. For a given original instruction to be replaced, either an 8 or 32 bit ESTOP 0 instruction will be used as the replacement. To pad out the software breakpoint to the original instruction size, an 8 bit or a 16 bit NOP instructions will be appended. Software breakpoint instruction replacement treats parallel instructions as a single instruction to be replaced. Thus, for the combination of SWBP-ESTOP( ) and NOP instructions, there is a combined instruction length format to match each instruction length format of the instruction set of the present embodiment.

ESTOP 0 instructions are not defined in the assembly language, they are only used by emulation software. The instruction encodings are: 'estop_0( )' (0x92) and 'estop_32( )' (0xFD000000).

An ESTOP 1 instruction is similar to an ESTOP 0, except the PC advances past the ESTOP 1 instruction. This instruction is used to embed a breakpoint into an application. The embedded breakpoint may be used while connected to an emulator or not. In the former case, the embedded breakpoint acts like a software breakpoint. In the latter case, the embedded breakpoint may generate an emulation trap to a Real Time Operation System (RTOS) (or monitor program) to service the emulation request. If no emulation event is configured, then this instruction is effectively a NOP instruction. This instruction is effective at the DECODE pipe stage. This instruction may appear in either position of a parallel pair. The ESTOP1 assembly mnemonic and encoding is 'estop_1( )' (0x2AC1).

The operation and use of the ESTOP instruction will now be described in more detail with reference to FIGS. 8–15.

Figures 8, 9, 11:
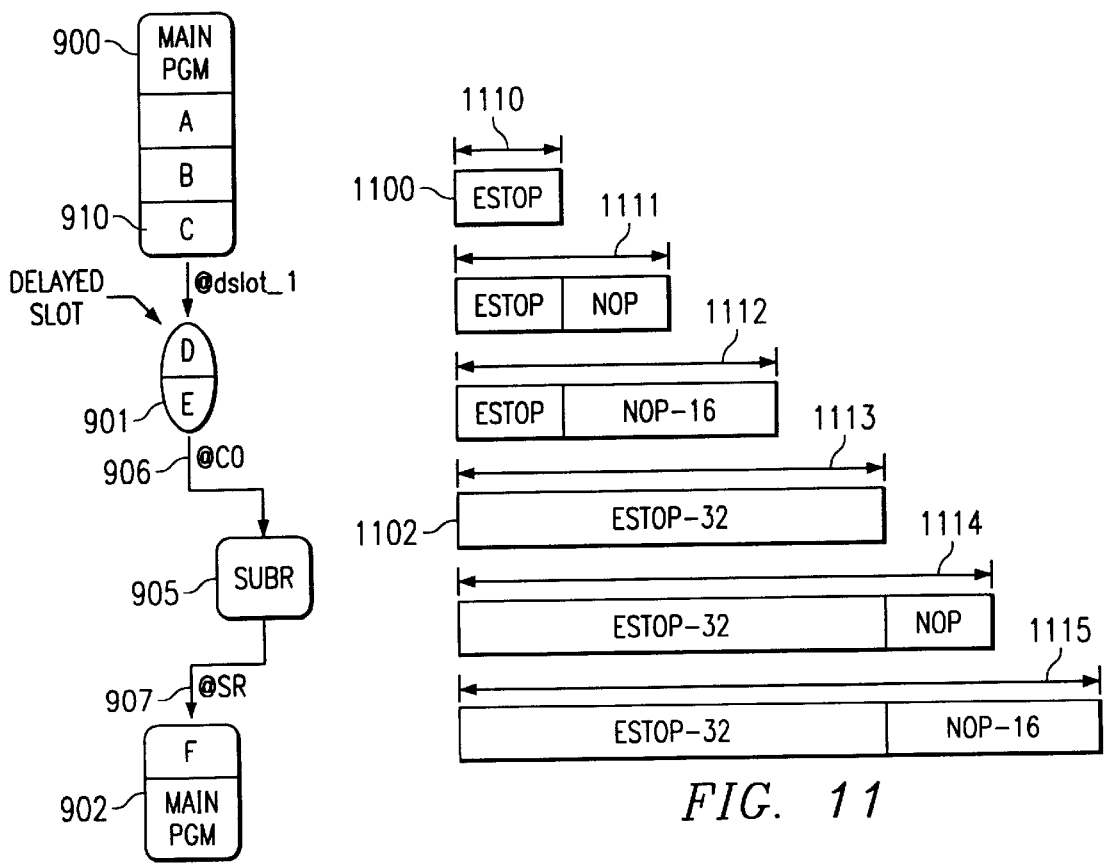
FIG. 8 is a schematic representation of the instruction pipeline during execution of a software breakpoint instruction.
FIG. 9 is a flow diagram illustrating program execution flow during a subroutine call.
FIG. 11 is a chart illustrating various length breakpoint instructions formed by combination with non-operational instructions, according to an aspect of the present invention.

FIG. 8 is a schematic representation of the instruction pipeline, described earlier, during execution of a software breakpoint instruction. An aspect of the present invention relates to a need to stop instruction execution on the boundary of an assembly language instruction during emulation in response to a software breakpoint instruction. Within the instruction pipeline of the present processor core embodiment, once an instruction has entered the address stage (P3), that instruction cannot be aborted for emulation purposes. The instruction must complete so that spurious memory accesses are not performed.

Referring still to FIG. 8, at time 800 the status of four instructions, A, B, C, and ESTOP, from a sequence of instructions are shown in four stages of the pipeline, P3, P2, P1, and P0, respectively. Other instructions from the sequence of instructions in stages P4–P6 are not shown, for clarity. ESTOP is a software breakpoint instruction. At time 802, each instruction has progressed to the respective next pipeline stage, while new instruction D has entered the pre-fetch stage. At time 804, each instruction has progressed to the respective next pipeline stage and new instruction E has entered the pre-fetch stage. At time 804, the ESTOP instruction is being decoded in the decode stage P2. At time 806, each instruction has progressed to the respective next pipeline stage and new instruction F has entered the pre-fetch stage.

After decoding the ESTOP instruction, a null is jammed into the address stage, as shown at 820. NULL is similar to a non-operational instruction NOP, except that NULL does not increment the PC (i.e. the state of the CPU remains unchanged) nor change the programmer's model of the CPU state (e.g. status bits are unchanged). The CPU is considered "halted" when a NULL instruction has been jammed into all pipeline stages from Address P3 to Execution P6, as shown in progress at 808, 810 and finally at 812.

The pipeline of the present embodiment operates with the following characteristics:

No change to registers or memory occur before the Address stage of the pipeline. Instructions which have been fetched into the Pre-Fetch, Fetch or Decode stage can be discarded and later re-fetched without changing the state of the programmer's model.

Changes to registers or memory which occur within the Address and later stage (Access, Read, Execute) do not rely on instructions prior to the Address stage (i.e. the contents of stages prior to Address could be discarded due to an interrupt or a branch).

The act of discarding the contents of pipeline stages prior to Address while allowing the Address and later pipeline stage to complete is referred to as flushing the pipeline.

The PC register (as displayed by an Emulation program) generally holds the address of the instruction in the Address stage of the pipeline. This is the instruction to be "performed" next assuming no instruction jam occurs.

The software breakpoint instruction will cause a debug event at the beginning of the Address stage of the instruction. If the breakpoint instruction was an ESTOP 0 (as set by the debugger) the PC will point to the address of the ESTOP instruction being executed, but for an ESTOP1 (as embedded in code) the PC will point to the address after the ESTOP instruction. In either case the status bits will not change from their prior value.

When an emulator host is not connected to processor 100 or when debug software has disabled emulation, ESTOPs will be treated as NOPs and the program counter will be incremented past the ESTOP instruction.

FIG. 9 is a flow diagram illustrating program execution flow during a subroutine call. Within the subroutine, the variables are accessed using stack pointer relative addressing, as illustrated in the following code sequence:

```
        push (DAx)              ; var1, data address register x
        push (DAy)              ; var2, data address register y
        ...
        dCall func_a            ; pushes PC onto the stack
        ...
func_a  ACy = ACx + *SP(offset_var1)  ; accumulator y, accumulator x
        ACy = *SP(offset_var2) * ACy
        return @PC
```

In the above code sequence, the term "*SP(offset_var1)" indicates that the data value located at a memory location that is relative to the stack pointer SP by an amount (offset_var1) will be fetched. A compiler calculates the relative address of each variable during the compile process. After pushing variables on the stack, a Delayed CALL (DCALL) instruction is executed which pushes the value of the program counter PC in response to executing the "dCall func_a" instruction. The return address is calculated by processor 100 based on the instruction length of the instructions following the DCALL instruction. The present instruction pipeline includes delay slots after an instruction that alters the program flow, such as a DCALL, JUMP, Branch, etc. Herein, these types of instructions will be referred to as "discontinuity instructions." A delay slot allows the execution of one or more instructions following a discontinuity instruction while the instruction pipeline is being flushed.

Referring still to FIG. 9, an example program is illustrated which includes a sequence of instructions in a first portion 900, one or more instructions in delay slot 901, and a sequence of instructions in a second portion 902. Instructions A, B, and C are representative of the sequence in 900. Subroutine 905 is a located in a different portion of instruction memory. A discontinuity instruction 910 results in a transfer of the program flow to subroutine 905, as shown at 906. Instructions D and E are executed during delay slot 901. After completing subroutine 905, program flow returns to sequence 902, beginning with instruction F, as shown at 907.

Figure 10A:
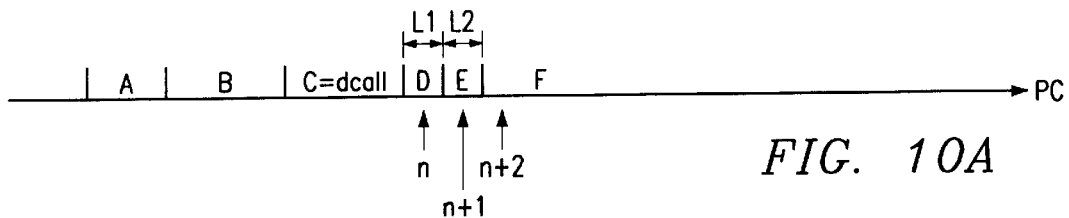
FIGS. 10A–10C are time lines illustrating the calculation of a return address during the subroutine call of FIG. 9 in conjunction with a software breakpoint instruction.
Figure 10B:
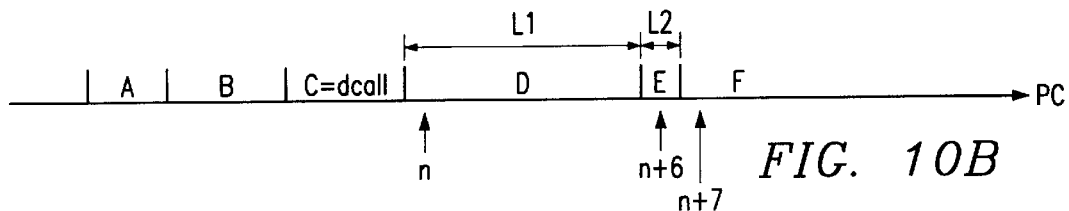
Figure 10C:
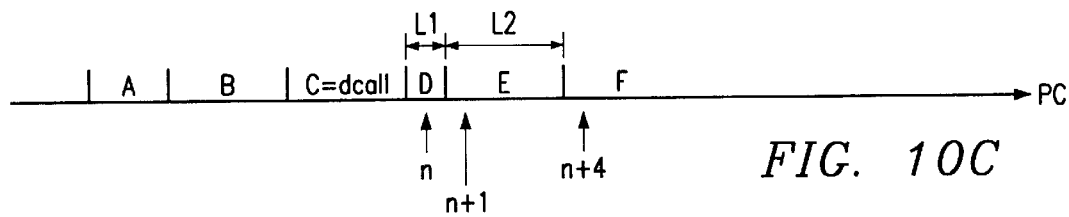

FIGS. 10A–10C are time lines illustrating the calculation of a return address during the subroutine call of FIG. 9 in conjunction with a software breakpoint instruction. According to aspects of the present invention, the instruction set of processor 100 includes several different instruction length formats. Since processor 100 has variable length instructions, the return address for a discontinuity instruction is calculated by decoding each of the instructions in the delay slot in order to determine their combined length. FIG. 10A illustrates a case in which instruction D and E are both one byte instructions, having a length L1 and L2, respectively, of one byte. In this case, the return address is calculated to be n+2, where "n" is the value of the program counter after discontinuity instruction C. FIG. 10B illustrates a case in which instruction D has a length L1 of six bytes, so that the return address is calculated to be n+7. Likewise, FIG. 10C illustrates a case in which instruction E has a length L2 of three bytes, so that the return address is calculated to be n+4. Note, in these Figures, a DCALL instruction is illustrated as discontinuity instruction C, but this discussion applies to any discontinuity instruction in the instruction set of processor 100.

It is desirable to be able to replace any instruction in a program sequence with a software breakpoint instruction in order to perform software or hardware debugging. In order for the return address to be calculated correctly in the present embodiment of processor 100, there must be a software breakpoint instruction for each length of instruction in the instruction set of processor 100. As described earlier, the instruction set of processor includes instruction length formats of 8 bits, 16 bits, 24 bits and 32 bits. Moreover, instruction buffer unit 106 allows two instructions to be decoded and executed in a parallel manner in a single cycle, so that the instruction execution pipeline handles instruction length formats of 40 bits and 48 bits also. In other words, there are effectively six different instruction length formats in the instruction set of processor 100. Providing six different varieties of software breakpoint instructions, one for each instruction length format, is an aspect of the present invention.

Another aspect of the present invention is to combine a smaller number of software breakpoint instructions with a number of non-operational instructions in order to reduce the required number of software breakpoint instructions. This advantageously reduces the number of instructions that instruction decoders 512 and 514 need to recognize.

FIG. 11 is a chart illustrating various length breakpoint instructions formed by combination with non-operational instructions, according to an aspect of the present invention. Two varieties of software breakpoint instructions are provided, estop 1100, which has a length 1110 of 8 bits; and estop_32, which has a length 1113 of 32 bits, as was described earlier. Two varieties of non-operation instructions with parallel enable bits are included in the instruction set of processor 100 for other reasons: NOP with a length of 8 bits and NOP_16 with a length of 16 bits. As described with reference to FIG. 4, instructions in processor 100 can be combined by setting a parallel enable bit in one of the pair of instructions. Thus, by combining a selected one of the two estop instructions with a selected one of the NOP instructions and by setting the parallel enable bit in the NOP instruction, a software breakpoint instruction having a length 1110 of 8 bits, a length 1111 of 16 bits, a length 1112 of 24 bits, a length 1113 of 32 bits, a length 1114 of 40 bits or a length 1115 of 48 bits is provided.

The emulation software computes the instruction format of the instruction to be replaced, taking into account the parallelism and soft dual scheme before making the software breakpoint instruction substitution, as was described earlier.

Figure 12:
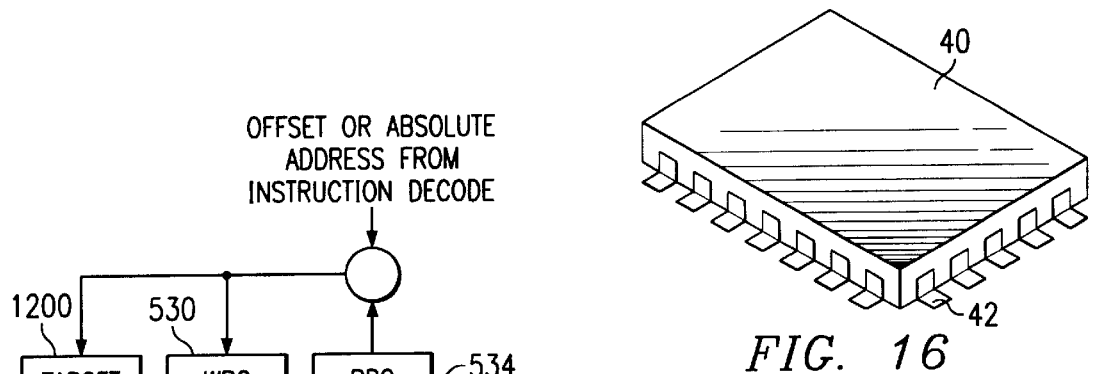
FIG. 12 is a more detailed block diagram of various registers used in the instruction buffer unit of FIG. 4.

FIG. 12 is a more detailed block diagram of various registers used in the instruction buffer unit for calculation of the return address. Target register 1200 holds the address of the target address of the discontinuity instruction. Write program counter 530, Local Write Program Counter 532, Read program counter 534, and Local Read Program Counter 536 were described with reference to FIG. 4. Temporary Read Program Counter 1210 and Temporary Write Program Counter 1220 hold values while they are being written to stack 1230.

Figure 13:
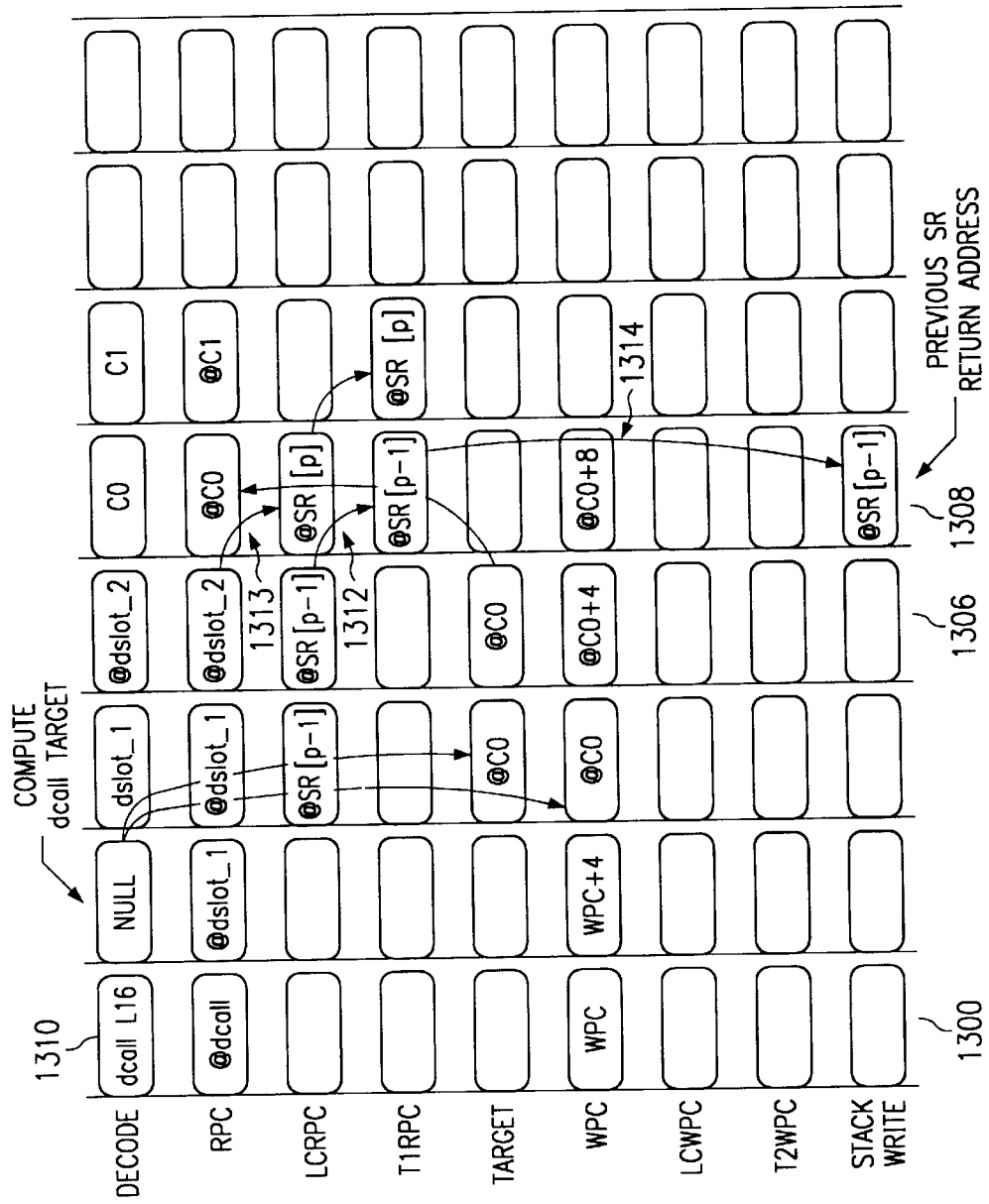
FIG. 13 is a timing diagram illustrating the operation of the instruction pipeline during a subroutine call.

FIG. 13 is a timing diagram illustrating the operation of the instruction pipeline during a subroutine call, as described earlier with respect to FIGS. 9 and 10A–10C. At time 1300, a discontinuity instruction is decoded at 1310. At time 1306, the contents of the LCRPC register 536 are transferred to the TLRPC register 1210 as shown at 1312. The contents are then written to stack 1230, as shown at 1314. Thus, the previous return address is saved on the stack. The return address for DCALL 1310 is saved in LCRPC during time 1308, as shown at 1313. LCRPC is actually the top of the stack (TOS) and the stack architecture of the present embodiment is pipelined with TOS being a register.

Still referring to FIG. 13, an address designated as "@SR(p−1)" refers to a previous return address, as opposed to the current return address "@SR(p)." For example, on a DCALL instruction SR(p) is saved and the return address of the DCALL becomes SR(p). SR(p−1) is stored in register TLRPC, while SR(p) is stored in register LCRPC. These register values get spilled to the stack so multiple nested DCALLS or interrupts, etc, are supported.

Figure 14:
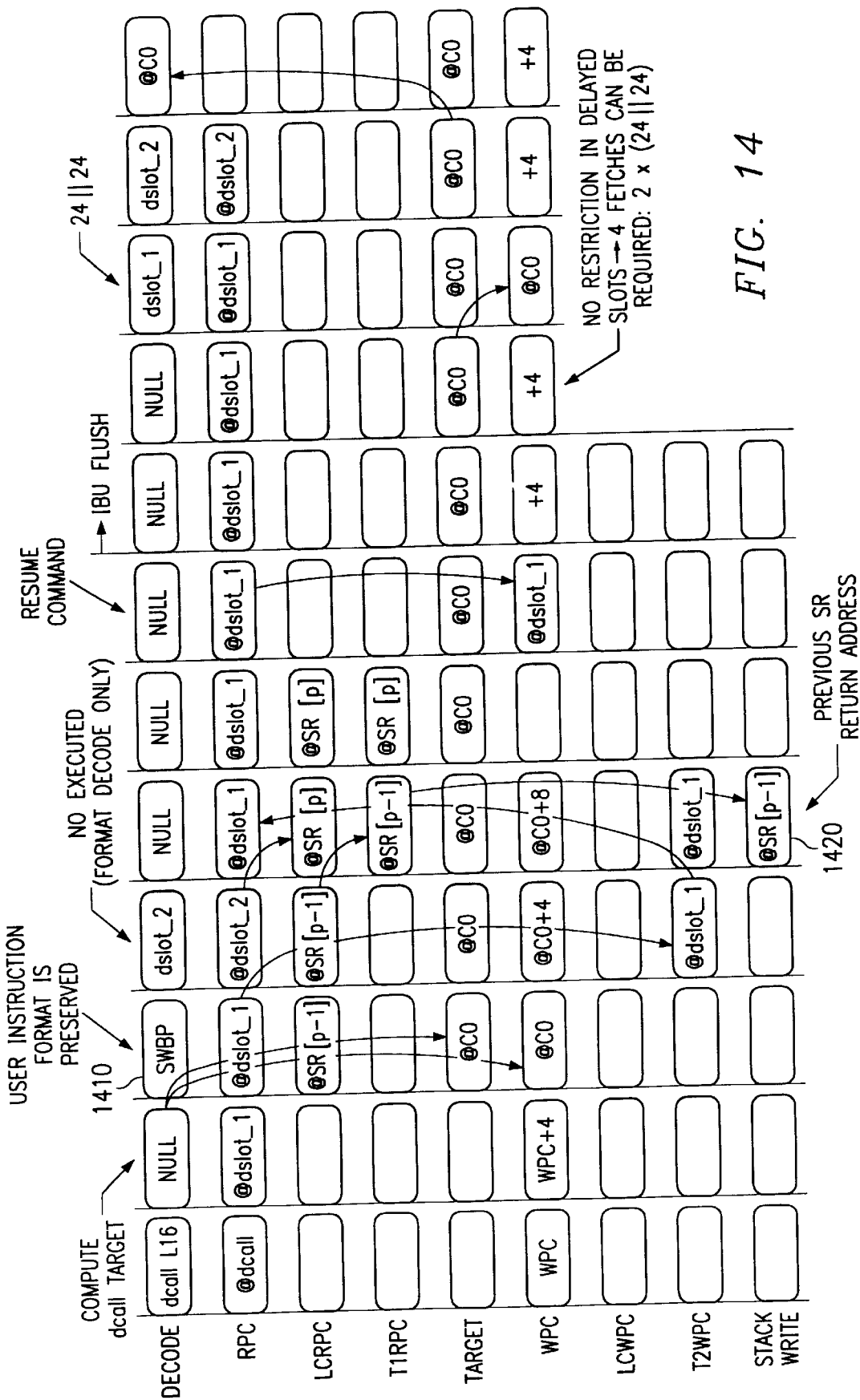
FIG. 14 is a timing diagram illustrating the operation of the instruction pipeline during the execution of a software breakpoint instruction placed in the first delay slot after a DCALL instruction.

FIG. 14 is a timing diagram illustrating the operation of the instruction pipeline during the execution of a software breakpoint instruction SWBP placed in the first delay slot after a DCALL instruction, shown at 1410. Advantageously, the software breakpoint instruction is the same length as the instruction it replaced, so that the same return address is calculated and stored in LCRPC and the previous return address is stored in stack 1230, as shown at 1420.

Figure 15:
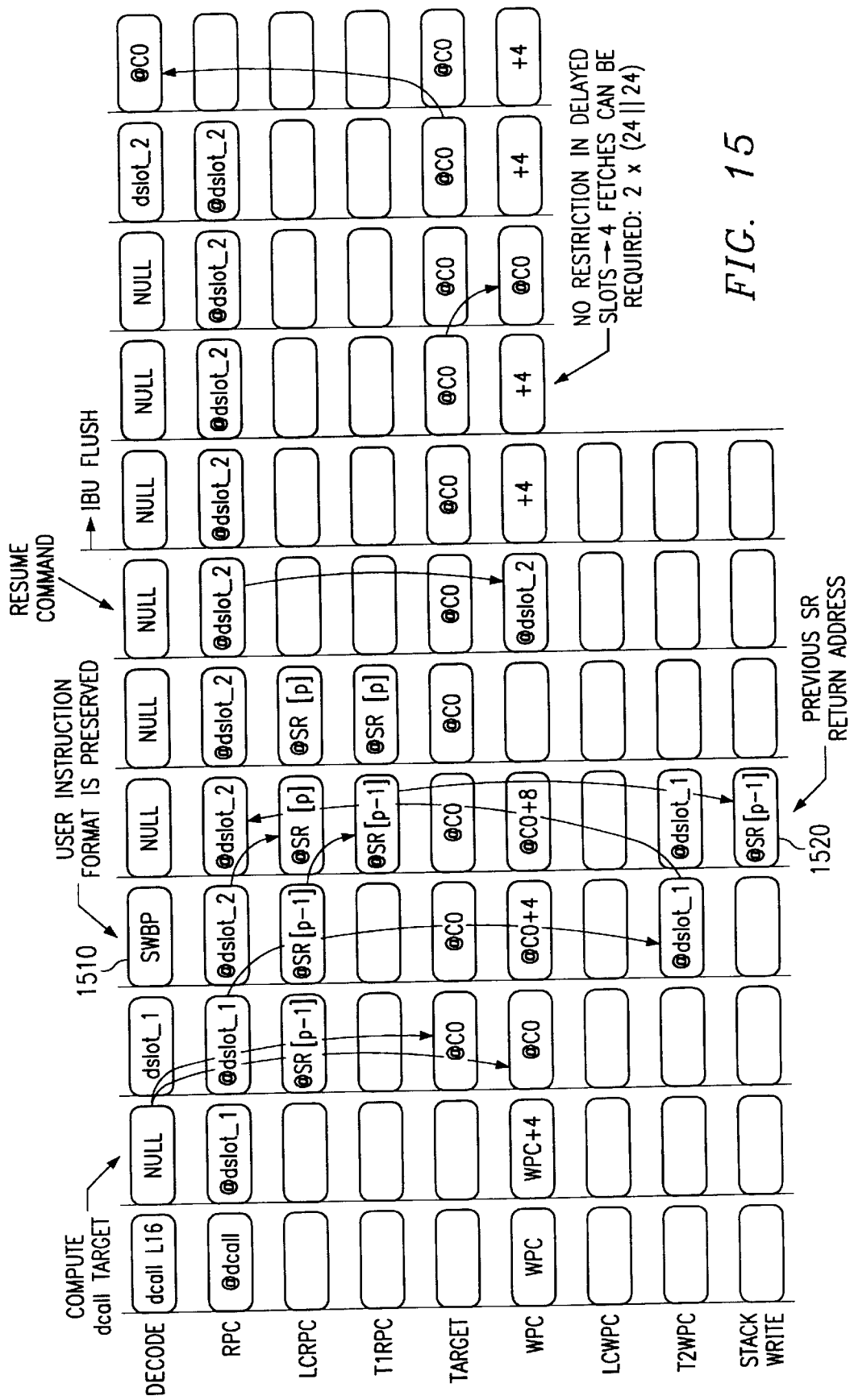
FIG. 15 is a timing diagram illustrating the operation of the instruction pipeline during the execution of a software breakpoint instruction placed in the second delay slot after a DCALL instruction.

FIG. 15 is a timing diagram illustrating the operation of the instruction pipeline during the execution of a software breakpoint instruction SWBP placed in the second delay slot after a DCALL instruction, shown at 1510. As with FIG. 14, the software breakpoint instruction is the same length as the instruction it replaced, so that the same return address is calculated and stored in LCRPC and the previous return address is stored in in stack 1230, as shown at 1520.

Figure 16:
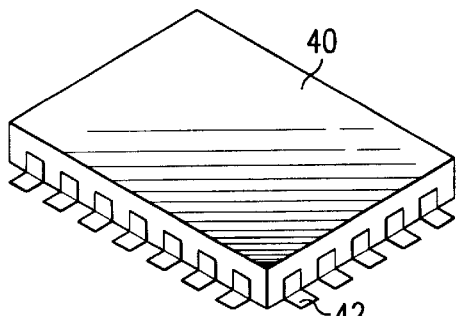
FIG. 16 is a schematic representation of an integrated circuit incorporating the processor.

FIG. 16 is a schematic representation of an integrated circuit incorporating processor 100. As shown, the integrated circuit 40 includes a plurality of contacts 40 for surface mounting. However, the integrated circuit could include other configurations, for example a plurality of pins on a lower surface of the circuit for mounting in a zero insertion force socket, or indeed any other suitable configuration.

Figure 17:
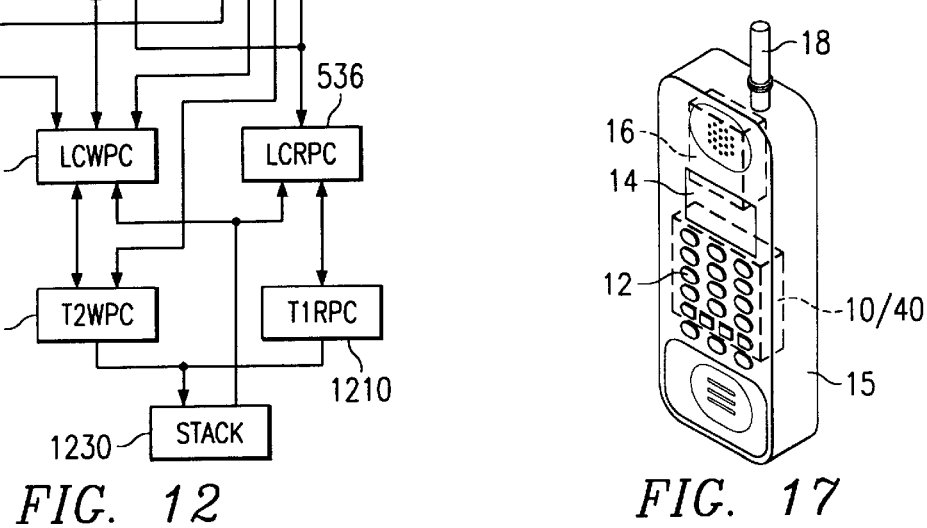
FIG. 17 is a schematic representation of a telecommunications device incorporating the processor of FIG. 1.

FIG. 17 illustrates a exemplary implementation of an example of such an integrated circuit in a mobile telecommunications device, such as a mobile telephone 15 with integrated keyboard 12 and display 14. As shown in FIG. 17, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An alternative embodiment of a software breakpoint instruction may have more than two instruction length formats. Likewise, different instruction encodings may be used.

An alternative embodiment of processor 100 may have more or fewer instruction pipeline stages, and the software breakpoint instruction may take effect in a different pipeline stage. Furthermore, the number of instruction length formats in an alternative embodiment may be greater or less than the six format lengths of processor 100.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. A software breakpoint instruction is provided for debugging purposes. In order to correctly emulate the operation of the instruction pipeline when a software breakpoint instruction is executed during a delay slot, the width of the software breakpoint must be the same as the replaced instruction. A limited number of breakpoint instruction length formats are combined with non-operational instructions to form a large number of combination instructions that match any instruction length format. Advantageously, only a small number of software breakpoint instructions need to be defined and decoded while still providing a large number of instruction length formats. For example, in the present embodiment, only two varieties of software breakpoint instructions are required to replace instructions having six different instruction length formats.

Advantageously, aspects of the present invention enable a software breakpoint to be inserted in a delay slot of a DCALL instruction.

Advantageously, the delay slot can be any length and the debug system can adjust the length of the SWBP instruction to match the length of the delay slot.

Advantageously, by supporting a SWBP on any instruction, such as in a delay slot, a processor according to the present invention is interruptible on any instruction. This improves CPU state machine observability during debug operations.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a microprocessor, wherein the microprocessor comprises:
   an instruction buffer unit operable to decode an instruction fetched from an instruction memory, wherein the instruction has a first length selected from a first plurality of instruction format lengths;
   a data computation unit for executing the instructions decoded by the instruction buffer unit;
   a program counter operable to provide an instruction address that is provided to the instruction memory; and
   wherein the instruction buffer unit is operable to decode each of a plurality of equivalent software breakpoint instructions each having a different length, such that for each instruction format length of the plurality of instruction format lengths there is an equal length software breakpoint instruction.

2. The digital system of claim 1, wherein one or more of the plurality of equivalent software breakpoint instructions is a combined software breakpoint instruction; and
   wherein the instruction buffer is operable to decode a software breakpoint instruction having a first length combined with a non-operational instruction having a second length in a single cycle such that the software breakpoint instruction and the non-operational instruction are treated as a combined software breakpoint instruction having a length equal to the first length plus the second length by the data computation unit.

3. The digital system of claim 2, wherein selected ones of a plurality of non-operative instructions each having a different length are combined with a selected ones of the plurality of software breakpoint instruction to form a plurality of combined breakpoint instructions, such that for each instruction format length of the plurality of instruction format lengths there is an equal length software breakpoint instruction or combined software breakpoint instruction.

4. The digital system according to claim 1 being a cellular telephone, further comprising:
   an integrated keyboard connected to the processor via a keyboard adapter;
   a display, connected to the processor via a display adapter;
   radio frequency (RF) circuitry connected to the processor; and
   an aerial connected to the RF circuitry.

5. A method of operating a digital system, comprising the steps of:
   executing a sequence of instructions in an instruction pipeline of a processor core, wherein the instructions are fetched in response to a program counter from an instruction memory associated with the processor core, wherein the sequence of instructions are selected from an instruction set having a plurality of instruction length formats;
   replacing a first instruction having a first instruction length in the sequence of instructions with a first software breakpoint instruction having a same length as the first instruction length for any length of the plurality of instruction length formats, wherein the first software breakpoint instruction is selected from a plurality of equivalent software breakpoint instructions each having a different length, such that for each instruction format length of the plurality of instruction format lengths there is an equal length software breakpoint instruction;
   breaking the execution sequence by executing the first software breakpoint instruction after executing a first portion of the sequence of instructions; and then
   resuming execution of the sequence of instructions by replacing the first software breakpoint instruction with the first instruction in the sequence of instructions.

6. The method of claim 5, wherein the first software breakpoint instruction is formed by the steps of:
   selecting a second software breakpoint instruction having a second instruction length;
   selecting a first non-operational instruction having a third length from a set of two or more non-operational instructions each having a different length; and
   combining the second software breakpoint instruction with the first non-operational instruction such that the combined length of the second instruction length and the third instruction length is equal to the first instruction length.

7. The method according to claim 6, wherein the step of combining comprises indicating that the second software breakpoint instruction and the first non-operational instruction are to be executed in a parallel manner in the instruction pipeline.

8. The method according to claim 5, wherein the first software breakpoint instruction is located in a delay slot resulting from executing a second instruction in the first portion of the sequence of instructions, the second instruction being a discontinuity type instruction causing a branch to a second sequence of instructions; and wherein the step of executing the second instruction comprises the steps of:
determining a combined length of instructions located in one or more delay slots of the second instruction by determining the length of the first software breakpoint instruction and any other instructions located in the one or more delay slots; and
calculating a return address for the second instruction in accordance with the combined length, such that the return address has a same value as if the first instruction were present in the first sequence of instructions.

9. The method according to claim 5, wherein the first instruction is a combination of at least two instructions selected from the instruction set which are to be executed in a parallel manner in the instruction pipeline.

10. The method according to claim 9, wherein:
the first software breakpoint instruction is located in a delay slot resulting from executing a second instruction in the first portion of the sequence of instructions, the second instruction being a discontinuity type instruction causing a branch to a second sequence of instructions; and
wherein the step of executing the second instruction comprises the steps of:
determining a combined length of instructions located in one or more delay slots of the second instruction by determining the length of the first software breakpoint instruction and any other instructions located in the one or more delay slots;
calculating a return address for the second instruction in accordance with the combined length, such that the return address has a same value as if the first instruction were present in the first sequence of instructions.

11. A digital system comprising a microprocessor, wherein the microprocessor comprises:
means for providing an instruction address to an instruction memory;
means for decoding each instruction fetched from the instruction memory, wherein each instruction has a length selected from a plurality of instruction format lengths, and wherein a discontinuity instruction includes one or more delay slots;
means for executing each decoded instruction;
means for replacing an instruction in a delay slot with an equal length software breakpoint instruction selected from a plurality of equivalent software breakpoint instructions each having a different length, such that for each instruction format length of the plurality of instruction format lengths there is an equal length software breakpoint instruction.

12. The digital system of claim 11, further comprising means for calculating a return address for a first discontinuity instruction by determining a combined length of instructions located in one or more delay slots of the second instruction such that a same return address is calculated whether or not an instruction in the delay slot is replaced by a software breakpoint instruction, for each and every instruction length selected from the plurality of instruction format lengths.

13. A method of operating a digital system, comprising the steps of:
executing a sequence of instructions in an instruction pipeline of a processor core, wherein the instructions are fetched in response to a program counter from an instruction memory associated with the processor core, wherein the sequence of instructions are selected from an instruction set having a plurality of instruction length formats, there being a discontinuity instruction having one or more delay slots in the sequence of instructions;
replacing a first instruction in a delay slot of the discontinuity instructions with a first software breakpoint instruction having a same length as the first instruction length for any length of the plurality of instruction length formats, wherein the first software breakpoint instruction is selected from a plurality of equivalent software breakpoint instructions each having a different length, such that for each instruction format length of the plurality of instruction format lengths there is an equal length software breakpoint instruction; and
executing the discontinuity instruction by determining a combined length of instructions located in the one or more delay slots by determining the length of the first software breakpoint instruction and any other instructions located in the one or more delay slots, and calculating a return address in accordance with the combined length, such that the return address has a same value as if the first instruction were present in the delay slot.

14. The method of claim 13, wherein one or more of the plurality of equivalent software breakpoint instructions is a combination software breakpoint instruction formed by the steps of:
selecting a second software breakpoint instruction having a second instruction length;
selecting a first non-operational instruction having a third length from a set of two or more non-operational instructions each having a different length; and
combining the second software breakpoint instruction with the first non-operational instruction such that the combined length of the second instruction length and the third instruction length is equal to one of the plurality of instruction format lengths.

15. The method according to claim 14, wherein the step of combining comprises indicating that the second software breakpoint instruction and the first non-operational instruction are to be executed in a parallel manner in the instruction pipeline.

* * * * *